Figure 1:
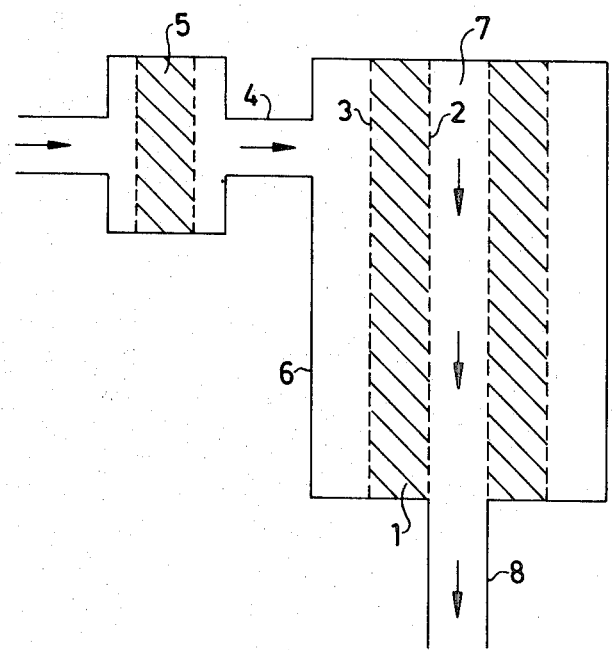

United States Patent [19]
Melkersson et al.

[11] 3,786,619
[45] Jan. 22, 1974

[54] METHOD OF PURIFYING GASES CONTAINING MERCURY COMPOUNDS AND ELEMENTARY MERCURY

[75] Inventors: Karl-Axel Melkersson, Helsingborg; Bo Gustav Valter Hedenas, Viken, both of Sweden

[73] Assignee: Boliden Aktiebolag, Stockholm, Sweden

[22] Filed: June 1, 1972

[21] Appl. No.: 258,626

[30] Foreign Application Priority Data
June 4, 1971 Netherlands................................ 7237

[52] U.S. Cl........................... 55/72, 55/74, 423/210
[51] Int. Cl............................................. B01d 53/04
[58] Field of Search.... 55/72, 74, 68, 387; 423/210, 423/508, 509

[56] References Cited
UNITED STATES PATENTS
| | | | |
|---|---|---|---|
| 3,194,629 | 7/1965 | Dreibelbis............................ | 423/210 |
| 3,257,776 | 6/1966 | Park et al................................ | 55/72 |
| 3,193,987 | 7/1965 | Manes et al............................ | 55/72 |

*Primary Examiner*—Charles N. Hart
*Attorney, Agent, or Firm*—Stevens, Davis, Miller & Mosher

[57] ABSTRACT

A method of purifying gases containing gaseous mercury. Mercury containing gas is passed through a mass of purifying material containing as an active constituent a material consisting of selenium, selenium sulphide or other selenium compounds or mixtures thereof.

9 Claims, 5 Drawing Figures

METHOD OF PURIFYING GASES CONTAINING MERCURY COMPOUNDS AND ELEMENTARY MERCURY

The present invention relates to a method of purifying gases containing mercury compounds and elementary mercury ($Hg°$), and more particularly to a method of removing mercury compounds from roaster gases obtained when roasting sulphide ores containing mercury compounds. The method, however, can also be used to advantage for removing mercury from other gases.

It has been discovered during recent years that the presence of mercury in industrial processes leads to mixed environmental nuisance risks through discharged gases and other waste products and to the contamination of the manufactured product with mercury. These problems are particularly serious in the case of such products as fertilizers and foodstuffs. Since sulphuric acid is being used in ever increasing quantities within the chemical industry, it has become increasingly important that the mercury content of the sulphuric acid produced be also progressively reduced which means that it must be possible to purify roaster gases containing sulphur dioxide, which is a normal starting material for the manufacture of sulphuric acid, of accompanying mercury and mercury compounds.

It is previously known to remove elementary mercury by absorption and oxidation in solutions. With one known method mercury-containing gases are passed into a hypochlorite solution at a pH of 4.5–9. For example, the USSR patent 165 900 and the US Pat. No. 3 476 552 illustrate examples of similar methods. It can also be mentioned that potassium permanganate solutions have been used for absorbing elementary mercury, particularly for analytical purposes, as disclosed for example in Amer. Ind. Hyg. Assoc. J. 17, 418–420 (1956).

It is also known that mercury can be removed from gases by absorption on solid materials, such as carbon and other carriers, impregnated for example with sulphides. An example of such a process is disclosed in the German Patent No. 1 075 953, according to which there is used a purifying substance comprising activated carbon with additions of alkali sulphides, alkali hydrosulphides or alkali polysulphides.

In addition to being formed when roasting mercury containing minerals, gases containing elementary mercury are also formed with chlorine-alkali processes and when regenerating certain mercury containing catalysts used in organic syntheses.

When roasting sulphidic minerals containing mercury compounds, the major portion of the mercury present therein can be separated from the gas as compounds in particulate form by means of conventional gas purification methods. It is impossible, however, to control the roasting process in a manner such as to obtain sufficiently low contents of elementary gaseous mercury in the gas from which the dust has been removed. As no difficulties are encountered in expelling mercury compounds from the roasted goods, the majority of the mercury present in the material will therefore normally be present in the roaster gas as mercury compounds and elementary mercury in particulate form or vapor form. In practice it is possible to remove particulate mercury by conventional dust purification processes, while mercury vapor accompanies the gas through the entire sulphuric acid manufacturing process and will be present in the manufactured sulphuric acid contaminating the same.

Thus, when roasting sulphide ores there is obtained a roaster gas, normally having a sulphur dioxide content of 4–16 percent, which contains volatile impurification compounds in greater or smaller quantities, depending on the composition of the ore. Such normal impurities include, i.a. compounds of arsenic, lead and antimony, and also mercury in free or chemically bound form. The obtained roaster gas containing sulphur dioxide is normally used for the manufacture of sulphuric acid and sulphur trioxide and liquid sulphur dioxide. The manufacture of sulphur dioxide, sulphur trioxide and liquid sulphur dioxide requires a very pure starting material in the form of sulphur dioxide gas, since in some instances impurities present in the gas may unfavorably affect the reaction sequence when producing sulphuric acid and sulphur trioxide, and are liable to contaminate the final product and the final waste gas.

The roaster gases formed when roasting sulphide material are passed from the furnace to a cyclone for example, in which the accompanying dust is separated form the gases in a conventional manner. The gases are then cooled and dry — purified, for example in an electrofilter. Final purification of the gas is effected, for example, by washing the gas in a washing tower with a following wet electrofilter. These methods, however, do not provide for the removal of elementary gaseous mercury to the extent desired.

It has now surprisingly been found that mercury compounds present in a roaster gas can be removed therefrom with a very high degree of efficiency and in the absence of the disadvantages associated with the use of activated carbon. Thus, in accordance with the invention, for the purpose of purifying the gas of mercury compounds and elementary mercury the gas is passed through a mass of gas purifying material presenting a very wide specific surface, the mass of purifying material comprising either an inert carrier of, for example, silicon dioxide, aluminium oxide, iron oxide or mixtures thereof, impregnated with selenium, selenium sulphide or other selenium compounds or mixtures thereof, or solely of the aforementioned selenium substances, which by granulation, compaction or other suitable agglomerating methods have been converted to the desired particle shape and size. The gas passed through the mass of purifying material should suitably have a temperature between 20° and 380°C, preferably between 20° and 300°C, and may advantageously contain 3–16 percent by volume $SO_2$, preferably 5–13 percent by volume $SO_2$. The gas may be dry or moist, although direct condensation of water on to the mass should be avoided, which means that the purifying mass should work at a temperature higher than the dew point of the gas. The active purifying mass is placed in a stationary bed through which the mercury containing gas is passed. For the purpose of avoiding, as far as possible, a pressure drop in the gas, the cross-sectional area of gas purifying bed presented to the gas flow should be as large as possible. One embodiment found to afford particularly favorable results is one in which the bed has the form of a hollow cylinder formed by a net structure enclosing the activated mass, the gas being passed into the bed in a direction towards the center of the cylinder and discharged through a tube placed centrally therein. When a particularly pure gas is required, the gas may be passed through a number of beds arranged sequentially in series and extending either vertically or horizontally.

A suitable embodiment of an apparatus for carrying out the method of the invention is illustrated in FIG. 1. With this embodiment, an activated mass of purifying material 1 is placed between cylindrical walls 2 and 3 of a net structure, or some other perforated structure. The gas is introduced through a line 4, in the illustrated embodiment via drip traps or electrofilters 5, to the chamber formed between an outer, dense casing 6 and the outer surface 3 of the activated mass. The gas passes radially from the chamber into the activated mass 1 and is collected in a centrally located tube 7, from which it is discharged from the apparatus via a line 8.

Since condensation of steam in the purifying mass may impair its purifying effect, the purifying mass is maintained at a temperature such as to prevent such condensation. This is achieved either by placing the mass in the hot portion of the gas system, or by heating the mass from an external source to a temperature which positively prevents condensation. The gas must be well cleansed of particulate substances upon entry into the purifying mass. Possible droplets of sulphuric acid present in the gas are removed by means of drip traps and/or electrofilters before the gas is passed to the bed.

An inert carrier produced from diatomaceous earth has been found to produce good results in those instances when it is desired to place the activated mass on a carrier. In accordance with the invention, the diatomaceous earth is pressed into cylindrical rods and burned at 700°-1000°C. The pore volume of the carrier is in this instance approximately 50 percent and the carrier has a specific surface of 1–100 m²/g. The inert carrier can be saturated with a solution of the activated material or a compound which can be converted to an active form, whereafter the solvent is driven off. For the purpose of obtaining high contents of the activated substance in the purifying mass, the mass can be saturated and dried a repeated number of times, until the desired content is obtained. A purifying mass having a high content of activated substance can entrap therein large quantities of mercury, thereby making the recovery of the mercury from the purifying mass beneficial.

In certain instances it may be advantageous to impregnate the purifying mass with a selenium compound, which in itself is less active as a mercury absorbent. One simple process in this respect is to impregnate the mass of purifying material with aqueous solutions of selenium dioxide, $SeO_2$, and to convert the obtained layer to highly active elementary selenium by means of $SO_2$. Since the gas to be purified normally contains $SO_2$, this activation of the selenium dioxide takes place automatically when the purifying mass is used. However, when purifying gases not containing $SO_2$ or other reducing components are used, it may be necessary to pre-treat the purifying mass with such gases.

The purifying mass produced and used in accordance with the invention may be regenerated by leaching out selenium and mercury with an acid or alkali, thereby also recovering non-consumed selenium. Regeneration of the purifying mass can also be effected by vaporizing the selenium and mercury.

The invention will now be described with reference to a number of examples, reference also being made to FIGS. 2–5, which are diagrams showing the quantity of mercury present in the discharged gas as a function of the quantity of gas passing through the mass.

EXAMPLE 1

Preparation of a Carrier Material

An inert carrier was produced by stirring 8 kg of diatomaceous earth with 0.9 kg of starch in 6.1 l of water. 230 ml of concentrated ammonium hydroxide were added to homogenize the mix. The mix was worked and pressed into cylindrical rods having a diameter of 4 mm. The rods were dried and then burned at 800°C for two hours. The carrier material obtained was found to have a high degree of mechanical strength and a specific surface of 2 $m^2g^{-1}$, its porosity was approximately 50 percent.

EXAMPLE 2

Purification of Dry Air Containing Mercury Sulphur Dioxide

A purifying mass was produced using an inert carrier material produced in accordance with the method described in Example 1. The inert carrier was impregnated with a solution of selenium dioxide to a selenium content of 0.14 percent by weight, 200 g of the selenium impregnated purifying mass were then placed in a bed having a diameter of 4.3 cm and a height of 35 cm.

A dry gas (relative humidity approximately 5 percent) comprising substantially 10 percent sulphur dioxide and 90 percent air and also containing 11 mg Hg/N $m^3$, was passed through the bed at a flow rate of 16.7 l/hour.

Figure 2:
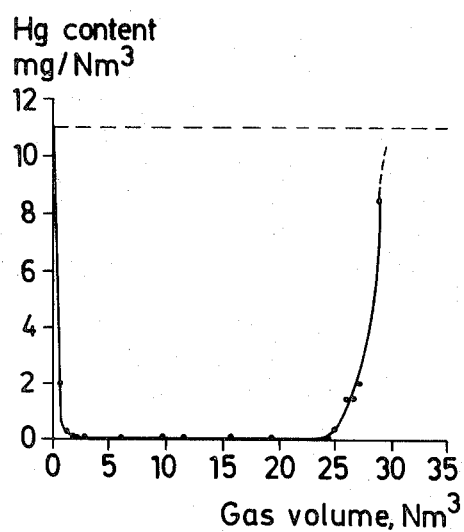

The mercury content was determined at regular intervals in the stream gas leaving the bed. The result obtained is illustrated in FIG. 2; from which it can be seen that the maximum effect of the purifying mass is reached after approximately 800 liters of gas has passed through the mass. This shows that at this point the selenoum dioxide has been reduced to activated selenium. The mercury content of the purifying mass reached a saturation point subsequent to 25 $Nm^3$ gas having passed through the bed. The content of mercury in the purifying mass was then on the average 0.14 percent by weight. When, by way of comparison, the gas was passed through a non-impregnated mass, no measurable absorption of mercury could be observed.

EXAMPLE 3

Purifying Dry Air Containing Mercury

An inert carrier of the type described in Example 1 was impregnated with a solution of selenium sulphide or a content of 1.5% Se. 100 g of the obtained purifying mass were placed in a bed of the same type as that described above. Air containing 10 mg/Hg/N $m^3$ was passed through the purifying mass at a volumetric flow of 150 l/h. Subsequent to 5 $Nm^3$ of gas having passed through the bed, the purifying mass showed an average mercury content of 0.19 percent by weight and the exiting, purified gas contained on average 0.07 mg Hg/$Nm^3$.

EXAMPLE 4.

Purifying Dry Air Containing Mercury and Sulphur Dioxide with a Purifying Mass Having a High Selenium Content.

An inert carrier of the type described in Example 1 was impregnated with an aqueous solution of $SeO_2$ to a selenium content of 7.3 percent by weight. The mass was crushed to a grain size of 0.6–0.8 mm. 1.2 g of the mass were then placed in a bed having a diameter of 0.5 cm and a height of 10 cm. A dry gas (relative humidity approximately 5 percent) comprising approximately 10% $SO_2$ and 90% air and containing 13.5 mg $Hg/Nm^3$ was passed to the bed at a flow rate of 16.7 l/h.

Figure 3:
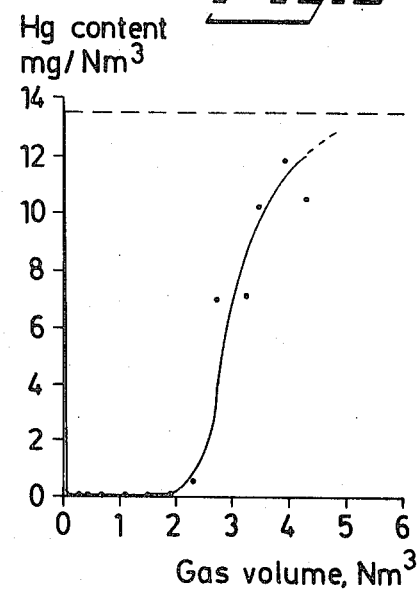

The content of mercury in the gas leaving the purifying container was determined at regular intervals. The result is illustrated in FIG. 3, from which it will be seen that the content of mercury in the exiting gas began to rise subsequent to approximately 2 $Nm^3$ gas having passed to the bed. The mercury content of the mass at this moment was on average approximately 3.3 percent and more than 8 percent in the part of the mass located nearest the gas inlet and representing 20 percent of the mass.

The purifying result was found to be very good during the period over which the test was carried out. Thus, the gas was found to contain only 0.05 mg $Hg/Nm^3$. By way of comparison it can be mentioned that when sulphuric acid is produced in a conventional manner by the contact method, approximately 0.1 g of mercury is obtained for every ton of sulphuric acid produced.

EXAMPLE 5

Purifying Air Containing Mercury and Sulphur Dioxide and Saturated Water Steam

A purifying mass with the same selenium content as that described in Example 4 was used. The gas used was air containing approximately 10 percent sulphur dioxide, 16 mg mercury/$Nm^3$ and also water to the saturation point at the temperature of the gas at the inlet to the purifying bed. The gas was cooled to only an insignificant extent during its passage through the bed, although the drop in temperature was sufficient to cause at least local condensation of the water.

Figure 4:
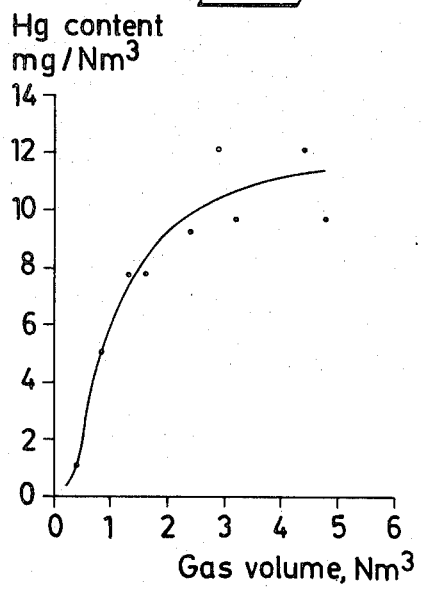

The mercury content in the gas departing from the purifying bed was measured and the result is illustrated in FIG. 4. The result was much poorer than that obtained with dry gas, which shows that the presence of liquid water leads to an unsatisfactory absorption of mercury. The bed, however, was still capable of absorbing mercury for a long period of time.

EXAMPLE 6.

Purifying Moist, but not Saturated, Air Containing Mercury and Sulphur Dioxide

A purifying mass having the same selenium content as that disclosed in Example 4 was used. The gas used was air with 10 percent sulphur dioxide containing 19 mg mercury/$Nm^3$ and water steam. The gas was saturated with water steam, whereafter the gas was heated to reduce the relative humidity to 90 %. No water was condensed in the bed.

Figure 5:
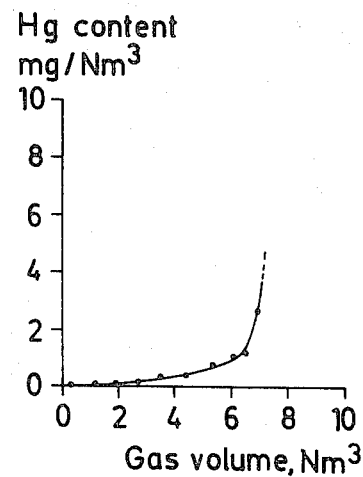

The mercury content of the gas leaving the bed was measured and the obtained result is illustrated in FIG. 5. The test was stopped when 7 $Nm^3$ of gas had passed through the bed. The test produced a purified gas having on average 0.4 mg $Hg/Nm^3$, which when using the gas in conventional sulphuric acid manufacturing processes corresponds to 0.9 g Hg/t of the product.

The consumed purifying mass was found to contain an average mercury content of 8 percent and the mercury content of the part of the purifying mass located nearest the gas inlet and representing 20 percent of the mass was determined to be approximately 12 percent.

We claim:

1. A method of purifying gases containing gaseous mercury, wherein the mercury containing gas is passed through a mass of purifying material which, as an active constituent, comprises selenium.

2. A method according to claim 1, wherein the active constituent is applied to an inert carrier selected from the group consisting of silicon dioxide, aluminum dioxide, iron oxide, ceramic material or mixtures thereof.

3. A method according to claim 1, wherein before being used the active constituent is formed into particles.

4. A method according to claim 1, wherein the purifying mass is activated by treating the mass with a gas containing a reducing component.

5. A method according to claim 1, wherein the gases passed through the purifying mass have a temperature between 20° and 380°C.

6. A method according to claim 1, wherein the gases passed through the purifying mass are roaster gases from a sulphide roasting processes.

7. A method according to claim 1, wherein the temperature and moisture content of the gas are adjusted so that liquid water is unable to condense in the mass.

8. The method according to claim 1 wherein said active constituent comprising selenium is selected from the group consisting of elemental selenium and selenium sulphide.

9. The method according to claim 4, wherein said reducing component comprises $SO_2$.

* * * * *

UNITED STATES PATENT OFFICE
CERTIFICATE OF CORRECTION

Patent No. 3,786,619   Dated January 22, 1974

Inventor(s) Karl-Axel Melkersson et al.

It is certified that error appears in the above-identified patent and that said Letters Patent are hereby corrected as shown below:

On the cover sheet, in the heading, item [30] should read as follows:

-- Foreign Application Priority Data

June 4, 1971        Sweden        7237 --.

Signed and sealed this 14th day of May 1974.

(SEAL)
Attest:

EDWARD M. FLETCHER, JR.
Attesting Officer

C. MARSHALL DANN
Commissioner of Patents